(12) United States Patent
Nack et al.

(10) Patent No.: US 11,026,042 B2
(45) Date of Patent: Jun. 1, 2021

(54) GEOFENCING MESSAGING SYSTEM

(71) Applicant: Comenity LLC, Columbus, OH (US)

(72) Inventors: David Nack, Bexley, OH (US); James Walz, Blacklick, OH (US)

(73) Assignee: Comenity LLC, Columbus, OH (US)

(*) Notice: Subject to any disclaimer, the term of this patent is extended or adjusted under 35 U.S.C. 154(b) by 132 days.

(21) Appl. No.: 16/374,396

(22) Filed: Apr. 3, 2019

(65) Prior Publication Data

US 2019/0230464 A1 Jul. 25, 2019

Related U.S. Application Data

(62) Division of application No. 14/626,816, filed on Feb. 19, 2015, now Pat. No. 10,292,008.

(60) Provisional application No. 62/096,195, filed on Dec. 23, 2014.

(51) Int. Cl.
| | |
|---|---|
| *H04W 4/021* | (2018.01) |
| *H04W 4/14* | (2009.01) |
| *G06Q 30/02* | (2012.01) |
| *H04W 4/21* | (2018.01) |
| *H04W 4/80* | (2018.01) |

(52) U.S. Cl.
CPC ........ *H04W 4/021* (2013.01); *G06Q 30/0261* (2013.01); *G06Q 30/0267* (2013.01); *H04W 4/14* (2013.01); *H04W 4/21* (2018.02); *H04W 4/80* (2018.02)

(58) Field of Classification Search
CPC ......... H04W 4/021; H04W 4/21; H04W 4/80; H04W 4/14; G06Q 30/0261; G06Q 30/0267

USPC ...................................... 455/3.01; 705/14.58
See application file for complete search history.

(56) References Cited

U.S. PATENT DOCUMENTS

| | | |
|---|---|---|
| 10,292,008 B2 | 5/2019 | Nack et al. |
| 2003/0182191 A1 | 9/2003 | Oliver et al. |
| 2008/0119206 A1 | 5/2008 | Shalmon et al. |
| 2010/0250351 A1 | 9/2010 | Gillenson et al. |

(Continued)

FOREIGN PATENT DOCUMENTS

JP 2002027525 A * 1/2002 ............. H04W 8/06

OTHER PUBLICATIONS

Directions Staff, How to Use Geofencing Correctly, 2013 (Year: 2013).*

*Primary Examiner* — Tarek Elchanti (57) ABSTRACT

A system for generating a customized communication with a customer is described, and includes: a near field communication (NFC) reader for receiving, from the customer, a request for an interaction; an input device for receiving an input from the customer, wherein the input includes a customer credential; a processor for: receiving a request, from a near field communication (NFC) enabled device, for an interaction with a customer; requesting a valid customer credential from the customer; receiving an input from the customer in response to a request for the valid customer credential to achieve a received customer credential; determining a validity of the received customer credential; and generating, after the determining the validity of the received customer credential, client information customized for the customer based upon a customer account linked to a determined valid customer credential to achieve a generated customized client information.

5 Claims, 5 Drawing Sheets

(56) References Cited

U.S. PATENT DOCUMENTS

| | | |
|---|---|---|
| 2011/0276378 A1 | 11/2011 | Pointer et al. |
| 2012/0101885 A1 | 4/2012 | Lee et al. |
| 2012/0159310 A1 | 6/2012 | Chang et al. |
| 2013/0217332 A1* | 8/2013 | Altman ................ H04W 12/04 455/41.2 |
| 2014/0040120 A1 | 2/2014 | Cho et al. |
| 2014/0074569 A1 | 3/2014 | Francis et al. |
| 2014/0180826 A1 | 6/2014 | Boal |
| 2015/0206128 A1 | 7/2015 | Torossian et al. |
| 2016/0027292 A1 | 1/2016 | Kerning |
| 2016/0180258 A1 | 6/2016 | Walz |
| 2016/0183051 A1 | 6/2016 | Nack et al. |
| 2016/0253651 A1 | 9/2016 | Park et al. |
| 2016/0253656 A1 | 9/2016 | Dubuque et al. |
| 2016/0321765 A1 | 11/2016 | Malone et al. |
| 2017/0303082 A1 | 10/2017 | Jones |

* cited by examiner

```
RECEIVES, FROM A PHONE CARRIER, A FIRST ALERT INDICATING THAT A MOBILE
DEVICE OF A CUSTOMER IS WITHIN A FIRST GEOFENCED AREA OF A SET OF
GEOFENCED AREA
305
```

```
COMPARES THE FIRST ALERT WITH A MEMORY STORE, WHEREIN THE
MEMORY STORE INCLUDES A SET OF CUSTOMER INFORMATION AND THE
SET OF GEOFENCED AREAS AND VENUE INFORMATION FOR AT LEAST ONE
LOCATION WITHIN THE SET OF GEOFENCED AREAS
310

ACCORDING TO A FIRST PREDETERMINED MATCH POLICY, DETERMINES A MATCH
  FOR CHARACTERISTICS BETWEEN THE SET OF CUSTOMER INFORMATION AND
  THE VENUE INFORMATION TO ACHIEVE A MATCHED VENUE; AND

BASED ON THE MATCHED VENUE AND ACCORDING TO A SECOND
  PREDETERMINED MATCH POLICY, DETERMINES A MATCH BETWEEN THE SET OF
  CUSTOMER INFORMATION, THE FIRST TIME PERIOD AND A SET OF MESSAGES
  ASSOCIATED WITH THE MATCHED VENUE TO ACHIEVE A DETERMINED MATCH,
  WEHREIN THE MESSAGE IS GENERATED BASED ON THE DETERMINED MATCH
  315
```

```
BASED ON A COMPARISON OF THE FIRST ALERT WITH THE MEMORY STORE,
GENERATES A FIRST MESSAGE THAT IS RELEVANT TO THE AT LEAST ONE LOCATION
AND A FIRST TIME PERIOD AT WHICH THE MOBILE DEVICE OF THE CUSTOMER IS
WITHIN THE FIRST GEOFENCED AREA
320
```

```
SENDS THE FIRST MESSAGE TO THE MOBILE DEVICE OF THE CUSTOMER
325
```

GEOFENCING MESSAGING SYSTEM

CROSS-REFERENCE TO RELATED APPLICATIONS

This application claims priority to and benefit of U.S. Patent Application No. 62/096,195, filed on Dec. 23, 2014 entitled "GEOFENCING MESSAGING SYSTEM" by James Walz, and assigned to the assignee of the present application, hereby incorporated by reference in its entirety.

This application is a divisional application of and claims priority to and benefit of co-pending U.S. patent application Ser. No. 14/626,816, filed on Feb. 19, 2015 entitled "GEOFENCING MESSAGING SYSTEM" by David Nack et al, and assigned to the assignee of the present application, hereby incorporated by reference in its entirety.

This application is also related to co-pending U.S. patent application Ser. No. 14/670,170, filed on Mar. 26, 2015 entitled "PUNCHCARD CHECK-IN SYSTEM", and assigned to the assignee of the present application.

BACKGROUND

Geofencing is a feature in a software program that uses the global positioning positioning system (GPS) or radio frequency identification (RFID) to define one or more geographic area. The software program provides a service that sends messages to smartphone users who enter this defined geographic area(s). For example, some companies send promotions to customers' smartphones when they enter a store, mall or neighborhood. Customers, however, must possess a smartphone in order to receive these offers, promotions, etc. Thus, this method of geofencing reaches a limited customer base. Limitations exist with regard to current geofencing technology.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

SUMMARY

The following is a summary of at least one embodiment of the present technology:

An article of manufacture, which includes a computer readable medium having stored therein a computer program for generating a customized communication with a customer, the computer program including: a first code segment which, when executed on a computer, receives, from a phone carrier, a first alert indicating that a customer is within a first geofenced area of a set of geofenced areas; a second code segment which, when executed on the computer, compares the first alert with a memory store, wherein the memory store comprises a set of customer information, the set of geofenced areas and venue information for at least one location within the set of geofenced areas; and a third code segment which, when executed on the computer, based on a comparison of the first alert with the memory store, generates a first message that is relevant to the at least one location and a first time period at which the customer is within the first geofenced area.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "receiving," "comparing", "generating", "sending", "providing", "determining", or the like, often refer to the actions and processes of an electronic computing device (or portion thereof), module or system, such as, but not limited to, a geofencing messaging system (See FIGS. 1 and 2), unless noted otherwise. The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Embodiments and Discussion

Geofencing is a feature in a software program that uses the global positioning positioning system (GPS) or radio frequency identification (RFID) to define one or more geographic area. The software program provides a service that sends messages to smartphone users who enter this defined geographic area(s). For example, some companies send promotions to customers' smartphones when they enter a store, mall or neighborhood. Customers, however, must possess a smartphone in order to receive these offers, promotions, etc. Thus, this method of geofencing reaches a limited customer base. Limitations exist with regard to current geofencing technology.

Embodiments of the present technology function in conjunction with any type of mobile device, including smartphones. For example, the mobile device is tracked using various known technological means (explained briefly below) to ascertain the current position of the mobile phone, and hence, the current position of the user (potential customer) of the mobile phone, whether the mobile device is moving or stationary. Embodiments receive this "localization" (locating the position of the mobile device) information, generate offers relevant to the customer based on the customer's current location and the venues (e.g., retail stores) surrounding the customer, and send these offers via messages to the customer. While embodiments function for any type of mobile device, for the purposes of clarity and brevity within the following discussion of embodiments, the mobile device will variously be referred to as a "mobile phone".

Embodiments utilize a phone carrier's ability to apply localization technology to determine the customer's physical position via determining the position of the customer's mobile phone's. This localization technology that may be used with embodiments is known in the art and includes, but is not limited to, the following techniques: network-based; SIM; WiFi; and a hybrid of the foregoing. Various phone carriers utilize one or more of the foregoing techniques.

The following is a high-level non-limiting example of embodiments involving a business method and a geofencing messaging system. A company "C" is a business that provides marketing information to the customers of retailers. Thus, the retailers are the clients of company "C". Agreements are negotiated between the company "C" and the following three entities: the customer; the phone carrier "P" servicing the customer's mobile phone; and the retail client. The retail client may be any entity that is capable of contracting with the company "C" for marketing services that are to be directed at a customer.

With respect to the agreement between the company "C" and the customer, the company "C" obtains an "opt-in" consent from the customer such that the customer authorizes his phone carrier "P" to determine the location of his mobile phone and authorizes that the determined location information may be shared with the company "C". The company "C" uses this determined location information to generate and send location-based offers to the customer.

With respect to the agreement between the company "C" and the phone carrier "P", the company "C" contracts with a phone carrier "P" for localization services involving the customer's mobile phones. The company "C" provides to the phone carrier "P" the phone number of the customer's mobile phone. Company "C" compensates the phone carrier "P" five cents for every "ping" that the phone carrier "P" sends to a customer's mobile phone and for the transmission of the location information garnered from the pinging (that is subsequently sent to company "C" from the phone carrier "P").

With respect to the agreement between the company "C" and the client, the company "C" contracts with the client to receive compensation for sending authorized marketing material to consumers. The marketing material may be any type of information that promotes the client's venue. For example, the marketing material may be any of, but not limited to, the following: offers for goods and/or services; discounts to be applied to goods and/or services; recommendations involving goods and/or services; and information regarding goods and/or services available at the client's venue. The client's venue may be any of, but not limited to, the following: a retail store; a charity; a park; government buildings (e.g., museums, city hall); town tourist guides; etc. In one example, the client is a store, called "Zombwa", which provides exercise classes in an exotic dance style. The client contracts with the company "C" to transmit offers for "2 classes for the price of 1", when it is known that the consumer is within a particular distance of the Zombwa store front. Of note, it is not necessary that the client's venue be a for-profit business. For example, the client may be a government entity contracting with the company "C" to provide sightseeing maps, etc. to potential visitors to a new city.

The company "C" utilizes this location information to generate messages customized for, and therefore relevant to, the customer. For example, the company "C" compares this garnered location information to venue information (e.g., retail stores within/near the location at which the mobile phone is determined to be, event information associated with the retail stores) and to customer information that is stored at a database. The database is accessible to the company "C"; the database (i.e., memory store) may reside at the company "C" or it may reside external to the company "C".

Thus, in one embodiment, the business method described herein requires the use of a software program designed to compare the customer's determined current location with that information that is stored at a database and is accessible to the company "C", wherein this information includes customer information (e.g., purchasing history, personal information, income, etc.) and client information (e.g., client venue location, different client offerings to different consumers, etc.). The software program generates this information so quickly that it appears in real-time to the customer, such that the information that the customer receives at his mobile phone is still relevant to the consumer when the customer receives it; the customer has not traveled to a new location, for which the transmitted offers (information) would not apply. For example, the customer is about to walk by a yogurt store at 1:00 p.m. and the customer receives from the company "C" a message offering a large yogurt for the price of a medium yogurt. Thus, the customer receives this message enough in advance before passing the yogurt store that the customer is able to utilize the offer and it is relevant to the customer. However, if it is the case that such offers are not received in real time, then the customer may already be leaving the store parking lot via car when he receives the yogurt offer. The customer may no longer be interested in such an offer because he has already picked up a barbeque pork lunch at the restaurant next door to the yogurt store, and does not wish to park his car again, get out, and go buy yogurt in addition to having purchased his barbeque pork lunch.

In another embodiment, the business method does not require the use of a software program designed to compare the customer's determined current location with that information that is stored at a database and is accessible to the company "C", wherein this information includes customer information (e.g., purchasing history, personal information, income, etc.) and client information (e.g., client venue location, different client offerings to different consumers, etc.). This is because the information that is being compared is not as complex as that being analyzed by the computer described herein, and/or the messages being generated to the consumer are not time sensitive. For example, in one embodiment, the client is a hotel in Mexico. The client is only interested in sending a follow up message to its customer within 1 month of the customer's visit and stay at the hotel. The message may be the following: "Thank you for staying at Hotel Grande! If you visit us again within the next 6 months, you will receive ½ off".

Significantly, embodiments of the present technology do not require that the customer be using a "smartphone". Embodiments function with any type of mobile device, including smartphones.

Figure 1:
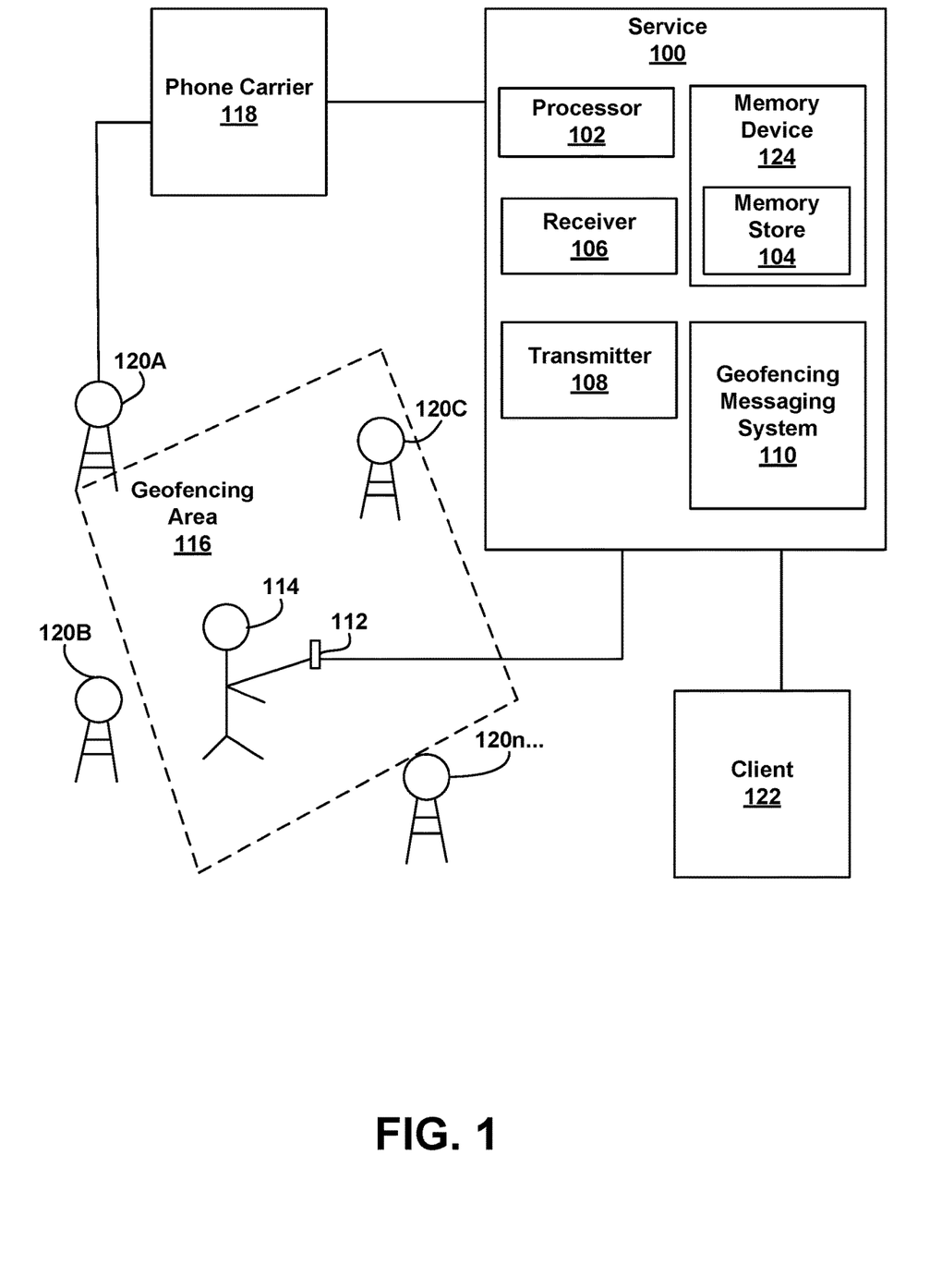
FIG. 1 is a block diagram that illustrates an embodiment of a geofencing messaging system, in accordance with an embodiment.
Figure 2:
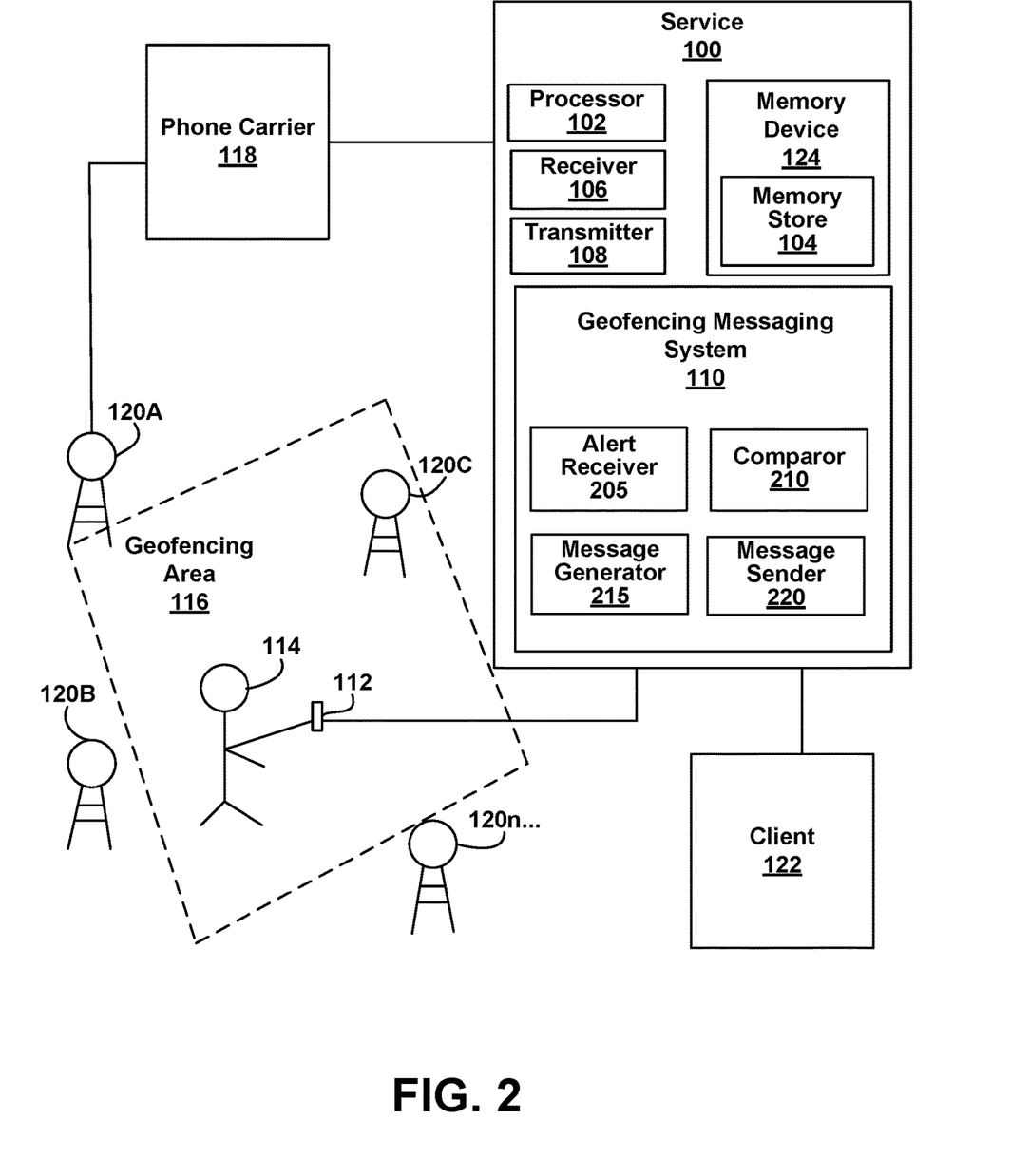
FIG. 2 is a block diagram that illustrates an embodiment of a system including a geofencing messaging system, in accordance with an embodiment.

The following discussion will begin with a description of both a business method for geofencing with SMS messaging and a geofencing messaging system, with reference to FIGS. 1 and 2. The discussion will follow with a description of a method of operation for geofencing with SMS messaging, with reference to FIGS. 1-3B. The discussion concludes with a description of an example computer system with which or upon which various embodiments of the present technology may be implemented.

Method for Geofencing with SMS Messaging

FIG. 1 depicts a block diagram that illustrates the entities, the hardware and the software involved in the business method described herein, in accordance with an embodiment. FIG. 1 shows the service 100, the mobile device 112 and the phone carrier 118 being communicatively and wirelessly coupled with each other. The service 100 is also communicatively and wirelessly coupled with the client 122. In one embodiment, the mobile device 112 is a mobile phone. Examples presented herein discuss embodiments in terms of including a mobile phone as the mobile device 112. However, it should be appreciated that the mobile device 112 may be a device that is not a mobile phone. FIG. 1 also shows a geofencing area 116 and antenna towers 120A, 120B, 120C and 120*n* . . . (hereinafter, "antenna towers 120", unless specifically noted otherwise). The geofencing area 116 is a predetermined geofenced area, for which venue information is stored at the memory store 104 or the memory device 124 that is accessible to the service 100. The antenna towers 120 function in conjunction with localization technology, as is known in the art.

The service 100 is a business that arranges for the method described herein to occur, such as: securing the contracts/agreements with the phone carrier 118, the client 122 (e.g., retailer) and the customer 114; receiving determined location information from the phone carrier 118; comparing this determined location information to a database of customer and venue information; generating customized messages to be sent to the customer; and transmitting these customized messages to the customer. Accessible to the service 100 and/or residing at the service 100 are at least the following: a processor 102; a memory store 104; a receiver 106; a transmitter 108; and a geofencing messaging system 110. Of note, in one embodiment, the phone carrier 118 specifically agrees to recognize when the mobile device 112 that is pinged is within a certain geofenced area, and then send an alert to the service 100, which includes the specific geofenced area. In another embodiment, the service 100 determines which geofenced area includes the determined location information. The service 100 accomplishes this, via the geofencing messaging system 110, by analyzing the xy coordinates of the determined location information and comparing them to the xy coordinate information stored at the memory device 124.

The processor 102 is configured for executing the methods described herein at least with regard to the geofencing messaging system 110. The processor 102 may be implemented, for example, by one or more discrete modules (or data processing components) that are not limited to any particular hardware, firmware, or software (i.e., machine readable instructions) configuration. The processor 102 may be implemented in any computing or data processing environment, including in digital electronic circuitry, e.g., an application-specific integrated circuit, such as a digital signal processor (DSP) or in computer hardware, firmware, device driver, or software (i.e., machine readable instructions). In some implementations, the functionalities of the modules are combined into a single data processing component. In other versions, the respective functionalities of each of one or more of the modules are performed by a respective set of multiple data processing components.

The memory store 104 is part of a memory device 124. In one embodiment. Memory store 104 stores process instructions (e.g., machine-readable code, such as computer software) for implementing methods executed by processor 102, as well as data that processor 102 generates or processes such as time difference between the first time period and the second time period, as will be discussed herein. The memory device 124 may include one or more tangible machine-readable storage media. Memory devices suitable for embodying these instructions and data include all forms of computer-readable memory, including, for example, semiconductor memory devices, such as EPROM, EEPROM, and flash memory devices, magnetic disks such as internal hard disks and removable hard disks, magneto-optical disks, and ROM/RAM devices.

The receiver 106 is configured for receiving, from the phone carrier 118, the location information. The transmitter 108 is configured for transmitting generated messages to the mobile device 112 of the customer 114.

According to an embodiment, an entity (e.g., service 100), provides compensation to a phone carrier 118 for pinging a mobile device 112 of a customer 114 according to a predetermined schedule. In one embodiment, the compensation is money/ping of the mobile device 112 to be paid to the phone carrier 118. The predetermined schedule is any schedule that the service 100 and the phone carrier 118 agree to regarding the pings of the mobile device 112. For example, in one embodiment, the predetermined scheduled is every 30 minutes. In another embodiment, the predetermined schedule is one time per day. In another embodiment, the predetermined schedule is six hours after a weather forecast predicts snow to fall. Thus, the predetermined schedule may be linked to other modes and systems of operation that are digitally accessible to the service 100 and/or the phone carrier 118, such as, but not limited to: a weather forecasting channel; a thermometer; and a news channel.

In one embodiment, based on the pinging performed by the phone carrier 118, the entity receives from the phone carrier 118 an alert when it is detected that the mobile device 112 of the customer 114 is within a first geofenced area 116 during the pinging. Of note, in another embodiment, the phone carrier 118 sends to the entity (e.g., service 100) the location information garnered from the pinging of the mobile device 112, and the entity determines the location of the mobile device 112.

In one embodiment, the entity sends to the mobile device 112 of the customer 114 a message that is tailored for the customer 114. The message is tailored for the customer 114 such that it is relevant to the current determined location of the mobile device 112 of the customer 114 at a particular time of the day that the mobile device 112 of the customer 114 is within the geofenced area 116. The message is relevant since it discusses information that would possibly interest the customer 114 in the topic. The customer's likely interest in a topic is based upon an already performed analysis of the customer 114; the entity has already collected information about the customer 114, from the customer 114 or from other authorized sources. Based on the characteristics of the customer and the characteristics of the venue within the geofenced area within which the mobile device 112 is determined to be, a message is sent to the customer 115 via the mobile device 112 in an effort to entice the customer 114 to perform a certain action. For example, the entity may know that the customer, "Fred" has a $500,000 annual salary, is male, and subscribes to boating magazines. The entity also receives location information from the phone carrier 118 that the customer 114 is about to pass a store offering expensive fishing adventures to Alaska. Fred receives, via his mobile device 112, a tailored message such as the following: "Remote (even for Alaska) Alaska Fishing-Cabin and Guide (6 nights, 7 days), Small Select Group-$15,000/Person". This is an offer that Fred may be interested in pursuing. However, in comparison, Fred would probably be less interested in receiving an offer from the beauty hair salon next door to the fishing store, offering a two hour hair treatment at a discounted rate. Nothing is the customer information stored at the memory store suggests that Fred would enjoy a two hour long hair treatment. The memory store does not have a purchasing history that includes a multitude of hair products, visits to hair salons, etc. Further, in the information that Fred filled out about himself and that is stored at the memory store, Fred did not answer any questions in the affirmative that would lead one to believe that he would enjoy at day at the salon.

In one embodiment, the service 100 receives an alert that the customer 114 is at a location that is different from the first location at which the customer 114 was determined to be. The service 100 then generates another message that is also tailored for the customer 114. For example, the first time that the mobile device 112 of the customer 114 was pinged, it was found that the customer 114, "Sue Ann" was in a mall at a furniture store. Stored at the memory device 124 is information indicating that Sue Ann resides in a rural area and that she likes to gamble. The second time that Sue Ann's mobile device 112 was pinged, it was determined that the mobile device 112 was at a pet store in the mall. In one embodiment, the mall is considered to be a geofenced area. Sue Ann is found, at two different times, to be at two different locations within the same geofenced area. When Sue Ann is found to be in the furniture store, the service 100 generates a message that offers Sue Ann an opportunity to sign up for a raffle, the winner for which receives a leather sofa. When Sue Ann is found to be at the pet store, the service 100 generates a message that offers Sue Ann an opportunity to adopt three kittens from the same litter.

In yet another embodiment, the phone carrier 118 pings the mobile device 112 over a period of time and sends this series of location information to the service 100. The phone carrier 118 indicates that the geofenced areas in which the mobile device 112 is determined to be are different from each other. For example, in one embodiment, the geofenced area is determined to be at an amusement park. Four hours later, the geofenced area is determined to be at a graveyard. Of note, and as discussed herein, while in one embodiment, the phone carrier 118 determines in which geofenced area (of a set of predetermined geofenced areas—wherein the geofenced areas are "predetermined" by the service and/or the phone carrier), in another embodiment, the service 100 receives location information from the phone carrier 118 and the service determines in which geofenced area the mobile device resides.

Thus, it can be seen that, based on the customer's personal information, the location at which the customer is determined, via pinging the customer's mobile phone, to be on a particular time and date. The service 100 then generates messages customized for the customer's.

FIG. 2 depicts a block diagram that illustrates an embodiment of a geofencing messaging system 200 that operates in conjunction with those components (phone carrier 118, client 122, mobile device 112, etc.) shown and discussed with reference to FIG. 1. The geofencing messaging system 200 includes the following modules coupled with a computer: an alert receiver 205; a comparer 210; and a message generator 215. In various optional embodiments, the geofencing messaging system 200 further includes a message sender 220.

The alert receiver 205 receives, from the phone carrier 118, an alert that indicates that the mobile device 112 of the customer 114 is within the geofenced area 116 of a set of geofenced areas. The set of geofenced areas may be one or more geofenced areas. In one embodiment, the alert receiver 205 receives the alert in the form of a data signal from the receiver 106 that is coupled with the geofencing messaging system 200. In another embodiment, the alert receiver 205 is the receiver 106.

The comparer 210 compares the alert with a memory store 104, wherein the memory store 104 includes a set of customer information, a set of geofenced areas and venue information for at least one location within the set of geofenced areas. The customer information and the venue information is organized in such a way at the memory store 104 such that the comparer can match particular information to that information stored at the memory store 104, which triggers particular messages to be generated. For example, stored at the memory store is information about the customer 114, named "Peggy". The information includes Peggy's age, height, gender, purchasing history with regards to particular stores, income, and profession. Peggy is 25 years old, five feet tall, a female, shops at stores for petite adult women, earns $80,000 per year, and is an attorney. Information about particular venues is also stored, such as that for the clothing store named "Pacific Clothing". This information includes the data that Pacific Clothing sells clothing designed for professional "petite woman" only. The alert that was received by the alert receiver 205 recognizes that Peggy's mobile phone (and hence Peggy) is located 100 yards from Pacific Clothing. The comparer 210 compares Peggy's current location, including the venues nearby within the geofenced area with the information stored at the memory store 104. The geofenced area stored at the memory store 104 shows that the Pacific Clothing store is located within the geofenced area. The comparer 210 compares the characteristics of the customer that are stored at the memory store 104 and compares the characteristics of the venues within the determined geofenced area, and links similar characteristics according to a predetermined policy.

For example, embodiments assign meaning to characteristics associated with both the customer and the venues. The "meaning" assigned may be any kind of label that facilitates the organization of a set of characteristics such that characteristics of a venue may be matched with like characteristics associated with customer information. For example, the Pacific Clothing store venue may be assigned the following meanings: "clothing store"; "women"; "petite"; "career"; "professional"; "young adult" "moderately priced" and "customer". Peggy's personal information may be assigned the following meanings: "25 years old"="young adult"; "female"="women"; "five feet tall"="petite"; "attorney"="career" and "professional"; and "earns $80,000 per year"="moderately priced". Thus, the comparer 210 is able to match the characteristics for the Pacific Clothing store with the characteristics for Peggy, the customer. If a predetermined number of characteristics match, then the comparer 210 finds a "match". For example, it may be predetermined that if five characteristics "match", then the venue is linked to the customer. Thus, in this case, the following characteristics of Peggy are found to be a match with the venue: 25 years old; female; five feet tall; attorney; and earns $80,000 per year. Peggy may have many more characteristics that do not match the characteristics of the venue; however, since five characteristics match, the customer information for Peggy is linked to the venue information for Pacific Clothing. Thus, a match determiner 225 determines, according to a predetermined match policy match (e.g., five matches required), a match for characteristics between the set of customer information and the venue information to achieve a matched venue.

After the matched venue is determined, then the message determiner 230, based on the matched venue, determines a match between the set of customer information, the time period at which the mobile device 112 is found to be at the venue and a set of messages associated with the matched venue to achieve a "determined match". The message that is sent to the customer is generated based on the determined match. Continuing with the example involving Peggy and the Pacific Clothing store, the matched venue is found to be the Pacific Clothing store. The message determiner 230 determines a match between the Peggy's personal information stored at the memory store 104, the time period at which the location of Peggy's mobile phone is determined and a set of messages associated with the Pacific Clothing store (the matched venue). The set of messages is a predetermined set of messages determined by the Pacific Clothing company, the service 100 and/or a third party entity. The set of messages may be any number of messages, such as one message, two messages, or hundreds of messages.

For example, if there is only one message associated with the Pacific Clothing store, the message might be, "Visit us at 222 Eastridge Mall. Clothing for Professionals on Sale". Linked to this one message is the characteristic of "All Customers". Peggy is linked to the characteristic of "customer" (at the stage of determining the message—in contrast to the stage of determining the match by the match determiner 225). Thus, in this case, the message determiner 230 determines that the one message and Peggy match since, according to a predetermined match policy (that at least seven characters have to match between the customer personal information and the message characteristics), the characteristic of the message, "All Customers" and the characteristic associated with Peggy, "customer", have similar content.

In another example in which the set of messages is two, these messages may be, "SALE ON WOMEN'S CLOTHING FOR PROFESSIONALS" linked to the characteristics "middle income", "professional" and "women" and "DEEP DISCOUNT FOR SELECTED ITEMS" linked to the characteristics "low income", "professional" and "women". Of note, the "middle income" characteristic is linked to the yearly income figure of between $50,000 and $100,000. As noted, Peggy's personal characteristics include the following: "earns $80,000 per year", "women" and "professional". The predetermined policy requires that three characteristics of the message characteristics have to match at least three characteristic of the customer's. If more than one message has three or more characteristics that match, then the message with the most characteristics that match the characteristics of the customer's characteristics is to be the determined match. In this instance, the message determiner 230 of the comparer 210 determines that the message, "SALE ON WOMEN'S CLOTHING FOR PROFESSIONALS" is the determined match since this message's characteristic's "middle income", "professional" and "women" match Peggy's characteristics of "earns $80,000 per year", "professional" and "women". Thus, the comparer 210 links the message, "SALE ON WOMEN'S CLOTHING FOR PROFESSIONALS" with the customer, Peggy. The message generator 215 then generates the message, "SALE ON WOMEN'S CLOTHING FOR PROFESSIONALS", based on the linking performed by the comparer 210.

The message generator 215, based on a comparison of the alert with the memory store 104, generates a message that is relevant to the at least one location and a time period at which the mobile device 112 of the customer 114 is within the geofenced area 116. The particular time period at which the mobile device 112 is found to be at a certain location also has an effect on the determination and the generation of the message. The message that is determined and generated may change if the mobile device 112 is found to be at a particular location in the early morning as opposed to the late afternoon, or during a heat wave in the summer time as opposed to a snow storm in the winter time. The messages that are sent can relate to the weather occurring at a certain time. For example, during a heat wave, a message may be sent that invites the customer into a store for a refreshment. During a snow storm, a message may be sent that offers a discount on winter coats and fur hats at a clothing retailer. Further, the time period, that is recorded and determined, at which the mobile device 112 is found to be at a first location, is significant because when the mobile device 112 is pinged again later, it is necessary to have a type of comparison between two time periods in order to determine if the mobile device 112 has been moved from one location to another location over a period of time.

Example Methods of Operation

The following discussion sets forth in detail some example methods of operation of embodiments. With reference to FIGS. 1-3B, a flow diagram of method 300 for geofencing with SMS illustrates an example procedure used by various embodiments. Method 300 includes some procedures that, in various embodiments, are carried out by a processor under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware).

The following discussion of method 300 references FIGS. 1-3B unless specifically noted otherwise.

Figure 3A:
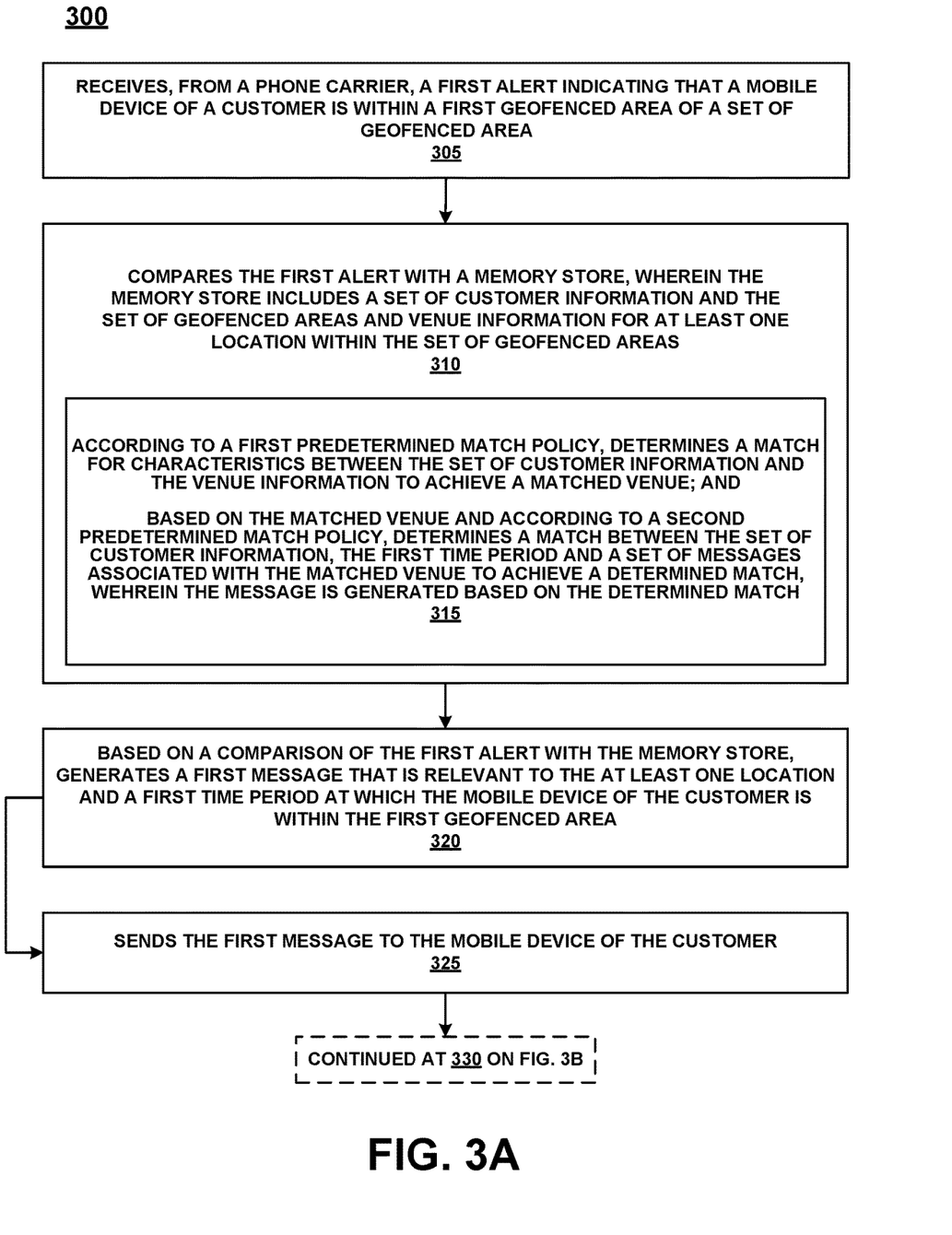
FIGS. 3A and 3B depict a flow diagram for a method for geofencing with SMS messaging, in accordance with an embodiment.

At step 305 of method 300, in one embodiment and as described herein, a first alert is received from the phone carrier 118. The first alert indicates that the mobile device 112 of a customer 114 is within a first geofenced area 116 of a set of geofenced areas.

At step 310 of method 300, in one embodiment and as described herein, the first alert is compared with the memory store 104, wherein the memory store 104 includes a set of customer information, the set of geofenced areas and venue information for at least one location within the set of geofenced areas. In one embodiment, the step 310 includes the step 315. At step 315 of method 300, in one embodiment and as described herein, according to a first predetermined match policy, a match for characteristics between the set of customer information and the venue information is determined, to achieve a matched venue. Further, based on the determined matched venue and according to a second predetermined match policy, a match between the set of customer information, the time period and a set of messages associated with the matched venue is determined to achieve a determined match, wherein the message is generated based on the determined match.

At step 320 of method 300, in one embodiment and as described herein, based on a comparison of the first alert with the memory store 104, a first message is generated. The first message is relevant to the at least one location and a first time period at which the mobile device 112 of the customer 114 is within the first geofenced area. In one embodiment, the first message is an offer to be executed at a time at which the customer 114 visits the venue. In another embodiment, the offer is a recommendation for the customer 114 to visit the venue within the first geofenced area 116.

At step 325 of method 300, in one embodiment and as described herein, the first message is sent to the mobile device of the customer.

Figure 3B:
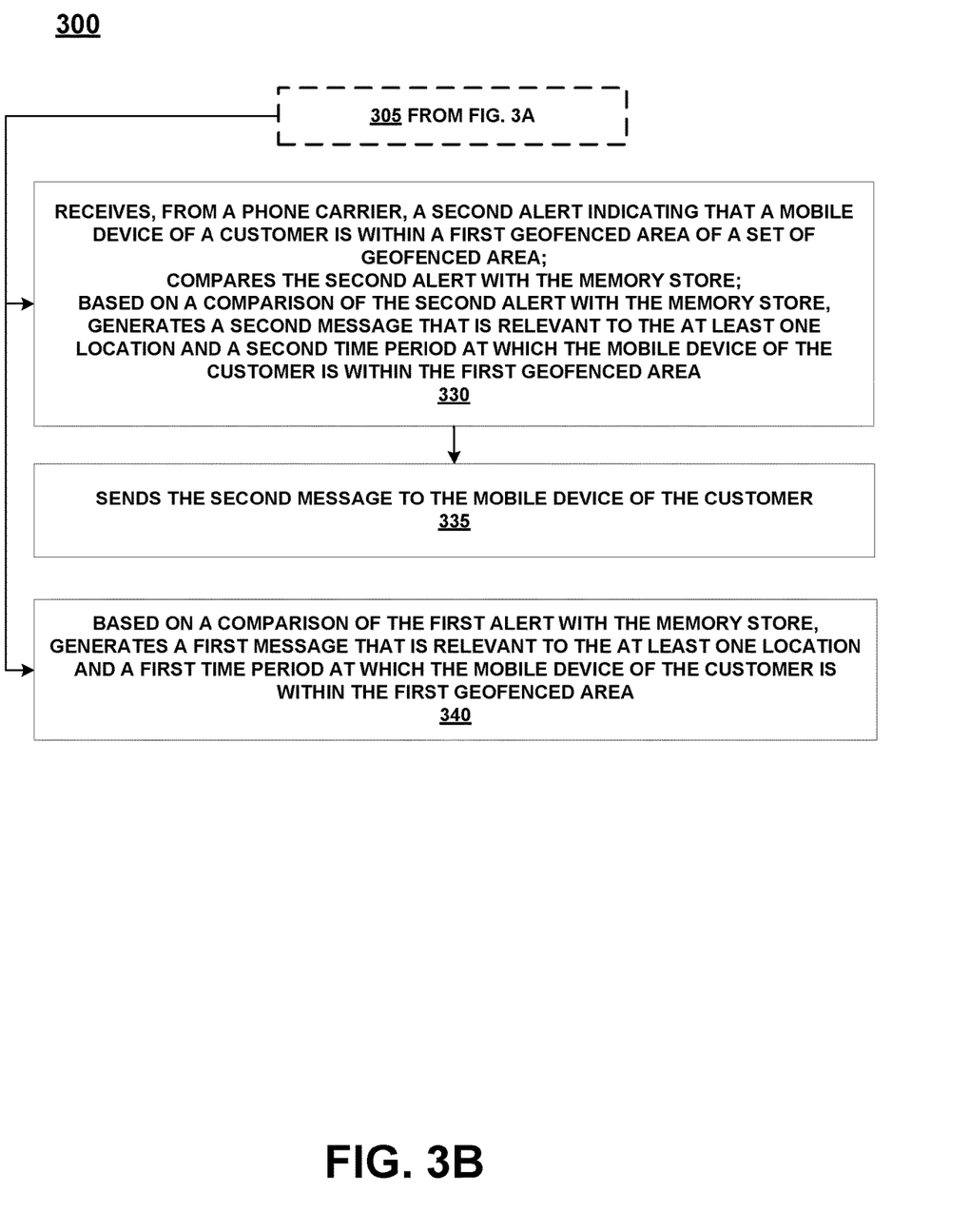

At step 330 of method 300, in one embodiment and as described herein, a second alert is received from the phone carrier 118. The second alert indicates that the mobile device 112 of the customer 114 is within the first geofenced area. The step 330 of method 300 further includes, in one embodiment and as described herein, a comparison of the second alert with the memory store 104. The step 330 of method 300 further includes, in one embodiment and as described herein, based on a comparison of the second alert with the memory store 104, a second message is generated. The second message is relevant to the at least one location and a second time period at which the mobile device 112 of the customer 114 is within the first geofenced area. In one embodiment and as described herein, the location at which the mobile device 112 is determined to be (at a first time period) is the same as the location at which the mobile device 112 is determined to be at a time period that is later than the first time period. Further, in one embodiment and as described herein, the location at which the mobile device 112 is determined to be (at a first time period) is different from the location at which the mobile device 112 is determined to be at a time period that is later than the first time period.

Step 330 further includes step 335. At step 335 of method 300, in one embodiment and as described herein, the second message is sent to the mobile device 112 of the customer 114.

At step 340 of method 300, in one embodiment and as described herein, a third alert is received from the phone carrier 118. The third alert indicates that the mobile device 112 of the customer 114 is within a second geofenced area of the set of geofenced areas, wherein the second geofenced area is different from the first geofenced area 116. Further, at step 340, in one embodiment and as described herein, the third alert is compared with the memory store 104. Further, at step 340, in one embodiment and as described herein, based on a comparison of the third alert with the memory store 104, a third message is generated. The third message is relevant to the at least one location and a second time period at which the mobile device 112 of the customer 114 is within the second geofenced area.

Example Computer System

Figure 4:
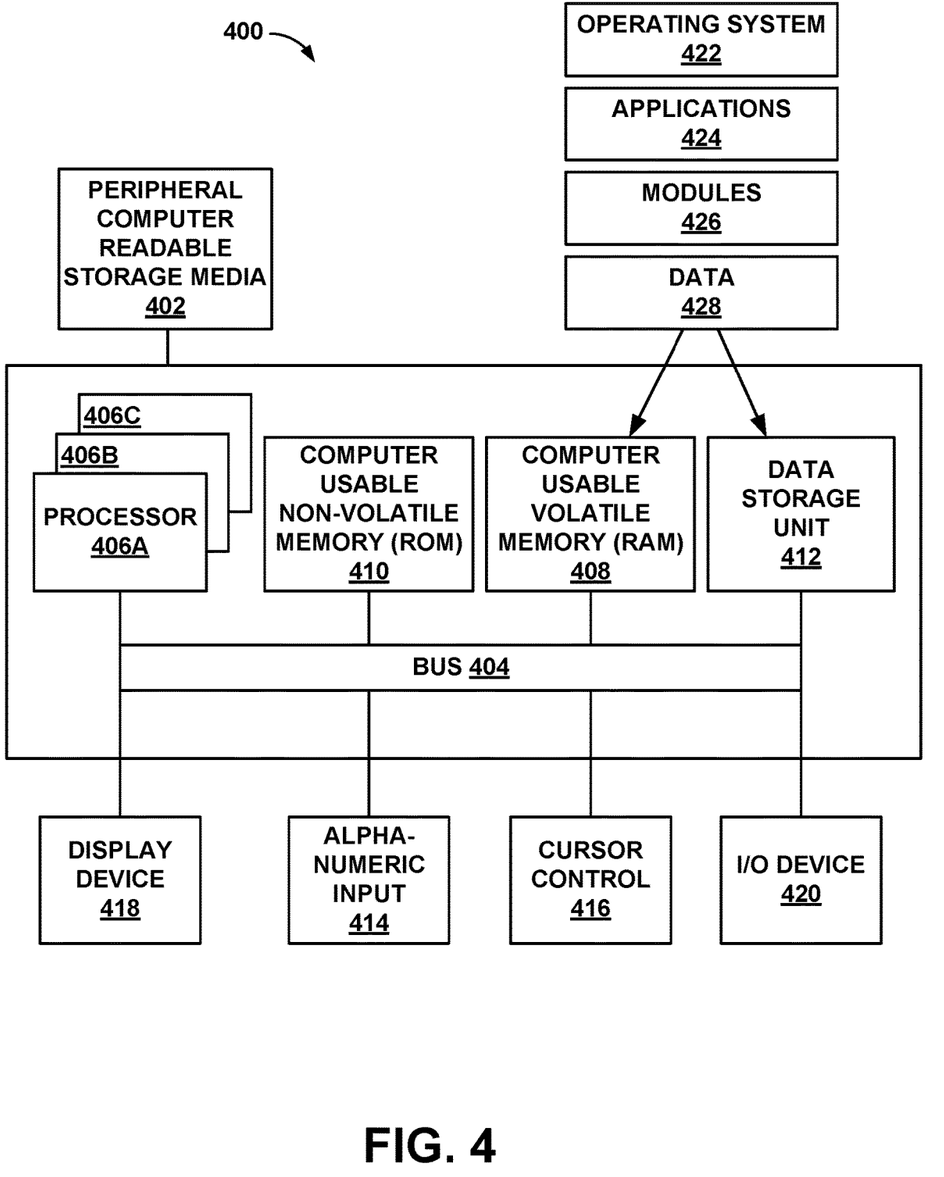
FIG. 4 is a block diagram of an example computer system with which or upon which various embodiments of the present invention may be implemented.

With reference now to FIG. 4, all or portions of some embodiments described herein are composed of computer-readable and computer-executable instructions that reside, for example, in computer-usable/computer-readable storage media of a computer system. That is, FIG. 4 illustrates one example of a type of computer (computer system 400) that can be used in accordance with or to implement various embodiments which are discussed herein. It is appreciated that computer system 400 of FIG. 4 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 400 of FIG. 4 is well adapted to having peripheral non-transitory computer-readable storage media 402 such as, for example, a floppy disk, a compact disc, digital versatile disc, other disc based storage, universal serial bus "thumb" drive, removable memory card, and the like coupled thereto.

System 400 of FIG. 4 includes an address/data bus 404 for communicating information, and a processor 406A coupled with bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors, and may be the processor 102 described with respect to FIGS. 1 and 2. System 400 also includes data storage features such as a computer usable volatile memory 408, e.g., random access memory (RAM), coupled with bus 404 for storing information and instructions for processors 406A, 406B, and 406C.

System 400 also includes computer usable non-volatile memory 410, e.g., read only memory (ROM), coupled with bus 404 for storing static information and instructions for processors 406A, 406B, and 406C. In one embodiment, the memory device 124 of FIGS. 1 and 2 is an example the computer usable volatile memory 408 and/or the computer usable non-volatile memory 410. Also present in system 400 is a data storage unit 412 (e.g., a magnetic or optical disk and disk drive) coupled with bus 404 for storing information and instructions. System 400 also includes an optional alphanumeric input device 414 including alphanumeric and function keys coupled with bus 404 for communicating information and command selections to processor 406A or processors 406A, 406B, and 406C. System 400 also includes an optional cursor control device 416 coupled with bus 404 for communicating user input information and command selections to processor 406A or processors 406A, 406B, and 406C. In one embodiment, system 400 also includes an optional display device 418 coupled with bus 404 for displaying information.

Referring still to FIG. 4, optional display device 418 of FIG. 4 may be a liquid crystal device, cathode ray tube, plasma display device or other display device suitable for creating graphic images and alphanumeric characters recognizable to a user. Optional cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

What we claim is:

1. A method for geofencing with SMS messaging, said method comprising:
    providing, by an entity, a set of geofenced areas to a phone carrier, the set of geofenced areas comprising: at least a first geofenced area and a second geofenced area;
    providing, by said entity, compensation to said phone carrier for pinging a mobile device of a customer according to a predetermined schedule;
    based on said pinging, receiving at said entity and from said phone carrier, a first alert when it is detected that said mobile device of said customer is within said first geofenced area during said pinging; and
    sending, to said mobile device of said customer, a first message that is tailored for said customer, wherein said first message is relevant to a first location and a first time period at which said mobile device of said customer is within said first geofenced area.

2. The method of claim 1, further comprising:
    sending to said mobile device of said customer a second message that is tailored for said customer, wherein said second message is relevant to a second location and a second time period at which said mobile device of said customer is within at least one of said first geofenced area and said second geofenced area.

3. The method of claim 2, wherein said first geofenced area is said second geofenced area, and wherein said first location is said second location, and said first time period is different from said second time period.

4. The method of claim 2, wherein said first geofenced area is said second geofenced area, and wherein said first location is different from said second location.

5. The method of claim 2, wherein said first geofenced area is different from said second geofenced area.

* * * * *